May 23, 1950 M. MEYERS 2,509,161
RACK GUIDE AND PINION ASSEMBLY
Filed June 8, 1949 2 Sheets-Sheet 1
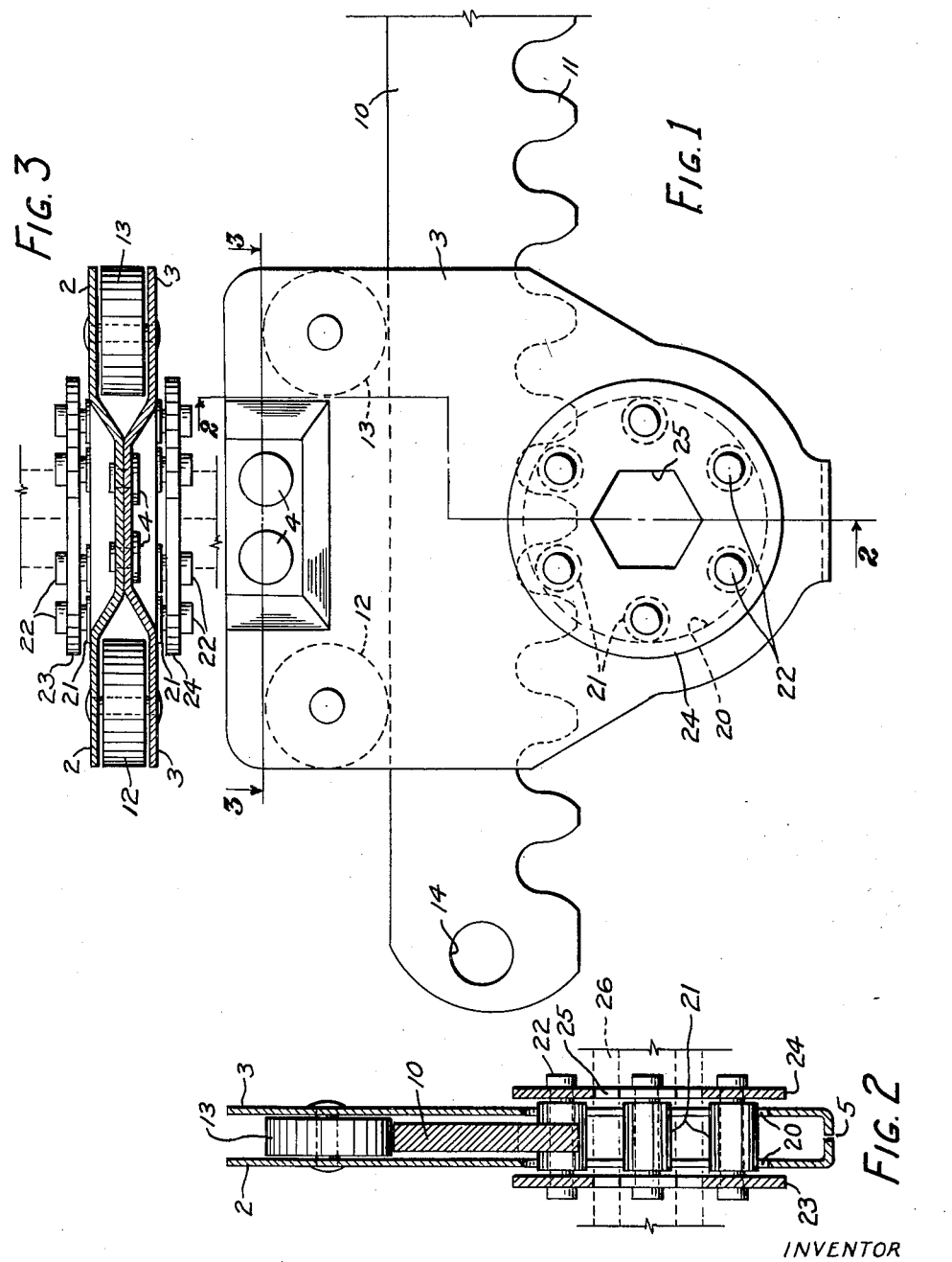
INVENTOR
Morris Meyers
BY
Attorney May 23, 1950     M. MEYERS     2,509,161
RACK GUIDE AND PINION ASSEMBLY
Filed June 8, 1949     2 Sheets-Sheet 2
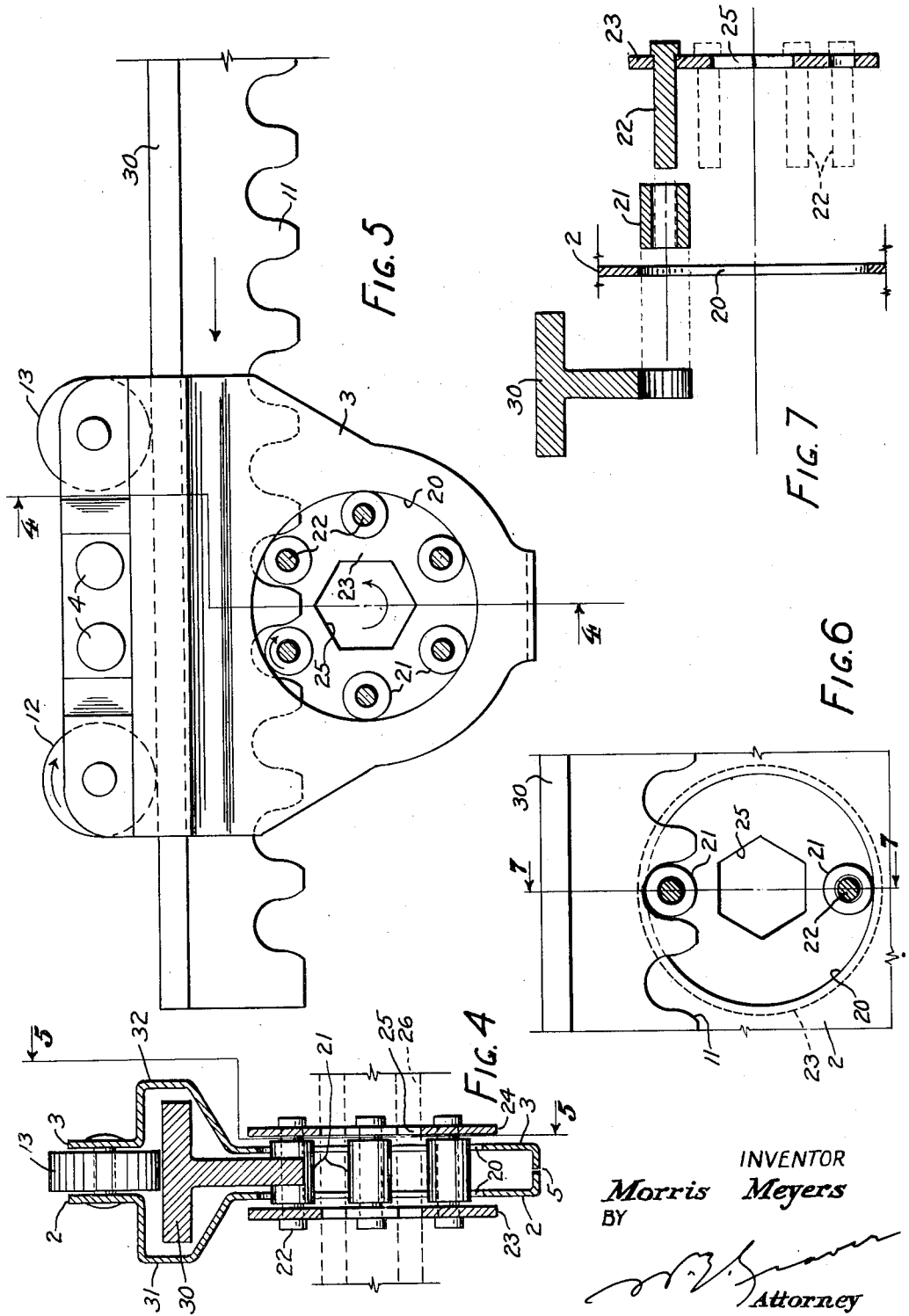
INVENTOR
*Morris Meyers*
BY
*Attorney*

Patented May 23, 1950

2,509,161

UNITED STATES PATENT OFFICE 2,509,161

RACK GUIDE AND PINION ASSEMBLY

Morris Meyers, Chicago, Ill., assignor of one-half to Julius J. Ohlis, Oak Park, Ill.

Application June 8, 1949, Serial No. 97,795

6 Claims. (Cl. 74—422)

This invention relates to a rack guide and pinion assembly and has for its object to provide an assembly which is practical, can be readily manufactured, and which can be produced at a minimum cost.

One of the objects of the invention is the provision of an assembly wherein the pinion comprises a series of circularly spaced tubular rollers for rolling engagement with the teeth of a rack.

Another object of the invention resides in a bearing for the pinion, said bearing comprising two parallel plates in superposed spaced relation, with a circular opening in each plate, said openings registrable with each other, and the surfaces of said openings constituting raceways for, and hence adapted to be engaged in more or less constant contact by, the series of rollers constituting the pinion.

A still further object of the invention is the provision of a pair of face plates, each adapted to substantially contact the outer surface of a bearing plate and to overlie the circular opening therein, said face plates having disposed therebetween said series of rollers which are carried by and positioned between the face plates through the instrumentality of pintles or rivets in such manner as to permit rotation of said rollers thereon.

And yet another object of the invention is to form the bearing plates so that they are maintained in parallel spaced relation to accommodate the rack and a pair of pressure rollers which latter maintain the rack in such position that its teeth will engage at all times the series of tubular rollers constituting the pinion.

With these and other objects in view the invention resides in the novel details of construction and combinations of parts as will be disclosed more fully hereinafter and particularly pointed out in the claims.

Referring to the accompanying drawings forming in part of this specification and illustrating two forms of construction, and in which like numerals designate like parts in all the views:

Fig. 1 is a side elevational view of one form of construction embodying this invention;

Fig. 2 is a vertical sectional view taken as on the line 2—2 of Fig. 1 and looking in the direction of the arrows;

Fig. 3 is a horizontal sectional view taken as on the line 3—3 of Fig. 1 and looking in the direction of the arrows;

Fig. 4 is a vertical sectional view taken as on the line 4—4 of Fig. 5 and looking in the direction of the arrows;

Fig. 5 is a side elevational view of another form of construction embodying this invention, with one face plate removed to better illustrate the arrangement and mounting of the tubular rollers constituting the pinion;

Fig. 6 is a detail view partly in section and partly in elevation illustrating the positions of two tubular rollers and the relation of one of them to the teeth of the rack; and Fig. 7 is a detailed sectional view with parts in separated positions to better illustrate the assembly relationship of a rack tooth, bearing plate, tubular roller, pintle for the tubular roller, and a supporting face plate.

Referring to the drawings the numerals 2 and 3 indicate a pair of bearing plates disposed in parallel spaced relation and secured together in their upper regions as by the rivets 4, said rivets preferably being passed through dished portions of said plates as especially shown in Figs. 1 and 3, said dished portions being directed inwardly of the complete assembly and having a substantial area thereof in contact with each other for imparting rigidity and permitting the use of short rivets as should be readily understood from the drawings. The bottom edge of each plate preferably is flanged or tuned inwardly, at substantially a right angle to the plane of the plate, a distance equal approximately to one-half of the parallel spacing of said plates wherefore, since said plates are duplicates of each other, this parallelism of the plates will be maintained by the riveted securement at the top and the substantially abutting relationship of the flanges or inturned edges at the bottom as indicated at 5 in Figs. 2 and 4.

A rack bar is indicated at 10 with teeth 11 formed on its lowermost edge, the upper edge being straight and parallel to the center of said teeth, said bar adapted to have relative longitudinal movement in the space created by the parallel bearing plates 2 and 3. A pair of pressure rollers 12 and 13 are carried by and between said plates in their upper portions and operate upon the upper straight edge of said rack bar to position said bar in a direction transversely thereof. One end of said bar may be provided with a hole 14 or other suitable means for connection with any instrumentality by which relative movement may be imparted by or to said bar.

A circular opening 20 is provided in the lower portion of each of the bearing plates, said openings being duplicates of each other and in registry with each other, the surface of each opening constituting a raceway for the tubular rollers generally identified by the numeral 21 and forming the pinion.

The pinion comprises a plurality of these tubular rollers arranged circularly in spaced relation to each other, the spacing being in accordance with the spacing and/or pitch of the teeth 11 of the rack bar 10. Each tubular roller is freely mounted upon a pintle or rivet such as 22 the opposite ends of which are headed for securement upon the outer surface of a pair of face plates 23 and 24 overlying the openings such as 20 of the bearing plates 2 and 3. Preferably the ends of each pintle are reduced in diameter to provide shoulders for maintaining the face plates in parallel spaced relation. In practice these face plates preferably will be round disks substantially in surface contact with the outer face of a bearing plate, and each tubular roller will be of an axial length such that its ends will just clear contact with the inner faces of said disks, though in the drawings these members have been illustrated in spaced relation for a clearer understanding of their individual construction and assembly. Each face plate or disk is provided with a central opening 25 (of hexagonal formation as illustrated) for the accommodation of a correspondingly formed shaft 26 by which rotary motion is imparted to or by the pinion. This pinion is so positioned in the bearing plates as to be in full operative engagement with the teeth of the rack bar, to the end that any transverse movement of said bar will be limited respectively by the pressure rollers 12 and 13 above said bar, and by said pinion below said bar, and said pinion is additionally positioned at a point substantially midway between and beneath said pressure rollers.

The construction illustrated in Figs. 4, 5, 6 and 7 differs from the foregoing substantially only in the provision of a T-shaped rack bar 30, and bearing plates 2 and 3 having lateral extensions 31 and 32 respectively for accommodating the head of the T-shaped rack bar.

This invention may be utilized in various manners, it having particular use in skylight and greenhouse structures wherein certain portions of said structures are intended to be hingedly moved with respect to other portions of said structures as for ventilation purposes. More specifically and by way of example, a rotatable shaft such as 26 may be mounted in suitable fixed bearings and provided with hexagonal or other polygonal portions fitting the complementally formed (hexagonal) openings 25 in a plurality of pinions mounted in the bearing plates of said particular assembly, with a rack such as 10 mounted between said plates, which rack is adapted to be operatively connected to the movable portion or section of a skylight or greenhouse roof. When the shaft is rotated, the pinions will cause reciprocatory movement of their associated racks with resultant opening or closing movement to the hinged portion of the skylight, the pressure rollers 12, 13 insuring constant enmeshment of a rack with its cooperating pinion. It is conceivable that in some installations there may be desired or required a reversal of the above mentioned action, but the arrangement herein described and disclosed is capable, within understandable limits, of giving rotation to a shaft by reciprocation of a rack.

It is obvious that those skilled in the art may vary the details of construction and arrangements of parts without departing from the spirit of this invention wherefore it is desired not to be limited to the exact foregoing disclosure except as may be required by the claims.

What is claimed is:

1. A rack guide and pinion assembly comprising a pair of parallel bearing plates, a rack disposed between and guided by said bearing plates, and a pinion having enmeshment with said rack whereby movement may be imparted relatively between said rack and said pinion, said pinion comprising opposed face plates and a circular series of tubular rollers mounted therebetween for rolling engagement with the teeth of said rack, said bearing plates having a pair of oppositely disposed registering circular openings the surfaces of which constitute raceways for said rollers, said face plates overlying said circular openings whereby to maintain said rollers in said raceways.

2. A rack guide and pinion assembly comprising two separate parallelly mounted bearing plates, a rack disposed between and guided by said bearing plates, and a pinion having enmeshment with said rack whereby movement may be imparted relatively between said rack and said pinion, said pinion comprising opposed face plates and a circular series of tubular rollers mounted therebetween for rolling engagement with the teeth of said rack, said bearing plates rigidly secured together to one side of said rack but separately associated to the other side of said rack, said bearing plates having a pair of oppositely disposed registering circular openings the surfaces of which constitute raceways for said rollers, said face plates overlying said circular openings whereby to prevent outward separation of said bearing plates and thereby to maintain said rollers in said raceways.

3. A rack guide and pinion assembly comprising two separate bearing plates rigidly secured in spaced relation to each other at their upper edge portions, the lower edge portions of said plates having independent inwardly directed plate spacing means, a rack disposed between and guided by said bearing plates, and a pinion having enmeshment with said rack whereby movement may be imparted relatively between said rack and said pinion, said pinion comprising opposed face plates and a circular series of tubular rollers mounted therebetween for rolling engagement with the teeth of said rack, said bearing plates adjacent their lower edge portions having a pair of oppositely disposed registering circular openings the surfaces of which constitute raceways for said rollers, said face plates overlying said circular openings wherby to prevent outward separation of the spaced bearing plates and thereby to maintain said rollers in said raceways.

4. A rack guide and pinion assembly comprising two separate bearing plates rigidly secured in spaced relation to each other at their upper edge portions, the lower edge portions of said plates being inturned to provide flanges disposed in edge abutting relation to each other and limiting the inward extent of the spaced plates, a rack disposed between and guided by said bearing plates, and a pinion having enmeshment with said rack whereby movement may be imparted relatively between said rack and said pinion, said pinion comprising opposed face plates and a circular series of tubular rollers mounted therebetween for rolling engagement with the teeth of said rack, said bearing plates adjacent their lower edge portions having a pair of oppositely disposed registering circular openings the surfaces of which constitute raceways for said rollers, said face plates overlying said circular openings whereby to prevent outward separation of the spaced bearing plates and thereby to maintain said rollers in said raceways.

5. A rack guide and pinion assembly comprising a pair of parallel bearing plates, a rack disposed between and guided by said bearing plates, and a pinion having enmeshment with said rack whereby movement may be imparted relatively between said rack and said pinion, said pinion comprising opposed face plates and a circular series of tubular rollers mounted therebetween for rolling engagement with the teeth of said rack, said bearing plates having a pair of oppositely disposed registering circular openings the surfaces of which constitute raceways for said rollers, said face plates having similarly formed and registering central apertures complementally cooperative with a power shaft, said face plates overlying said circular openings whereby to maintain said rollers in said raceways.

6. A rack guide and pinion assembly comprising a pair of parallel bearing plates, a rack disposed between and guided by said bearing plates, and a pinion having enmeshment with said rack whereby movement may be imparted relatively between said rack and said pinion, said pinion comprising opposed face plates and a circular series of tubular rollers mounted therebetween for rolling engagement with the teeth of said rack, said bearing plates having a pair of oppositely disposed registering circular openings the surfaces of which constitute raceways for said rollers, said face plates having similar and registering central apertures of substantially polygonal formation complementally cooperative with a power shaft, said face plates overlying said circular openings whereby to maintain said rollers in said raceways.

MORRIS MEYERS.

REFERENCES CITED

The following references are of record in the file of this patent:

UNITED STATES PATENTS

| Number | Name | Date |
|---|---|---|
| 1,109,928 | Jones | Sept. 8, 1914 |
| 1,176,933 | Souvielle | Mar. 28, 1916 |
| 1,223,754 | Berles | Apr. 24, 1917 |
| 1,338,671 | Burnham | May 4, 1920 |
| 1,473,907 | Hettrich | Nov. 13, 1923 |
| 1,529,642 | Callahan | Mar. 10, 1925 |